United States Patent [19]
Smith

[11] 4,255,890
[45] Mar. 17, 1981

[54] TROLLING PLANER AND RELEASE

[76] Inventor: Bert A. Smith, 2681 Merriman Rd., Medford, Oreg. 97501

[21] Appl. No.: 41,093

[22] Filed: May 21, 1979

[51] Int. Cl.³ .............................................. A01K 97/00
[52] U.S. Cl. .................................... 43/43.12; 43/43.13
[58] Field of Search ............................ 43/43.12, 43.13

[56] References Cited

U.S. PATENT DOCUMENTS

| | | | |
|---|---|---|---|
| 2,062,718 | 12/1936 | Kallberg . | |
| 2,667,008 | 1/1954 | Bauor | 43/43.15 |
| 2,749,649 | 6/1956 | Fitzsimmons | 43/43.12 |
| 3,032,912 | 5/1962 | Bengtsson | 43/43.13 |
| 3,628,274 | 12/1971 | Wojahn | 43/43.12 |
| 3,659,370 | 5/1972 | Ritter | 43/43.12 |
| 3,719,331 | 3/1973 | Harsch | 43/43.12 |
| 3,738,047 | 6/1973 | Tozer | 43/43.12 |
| 3,745,688 | 7/1973 | Brownlee | 43/43.12 |
| 3,778,918 | 12/1973 | Emory | 43/43.12 |
| 3,785,079 | 1/1974 | Rohn | 43/43.12 |
| 3,796,000 | 3/1974 | Nye | 43/43.13 |
| 3,797,159 | 3/1974 | Rieth | 43/43.12 |
| 3,800,458 | 4/1974 | Swanby | 43/43.12 |
| 3,816,954 | 6/1974 | Bissonette | 43/43.12 |
| 3,835,573 | 9/1974 | Borchardt | 43/43.12 |
| 3,839,813 | 10/1974 | Desmidt | 43/43.12 |
| 3,874,110 | 4/1975 | Larson | 43/43.12 |
| 3,879,884 | 4/1975 | Tucker | 43/43.12 |
| 3,892,083 | 7/1975 | Peterson | 43/43.12 |
| 3,897,648 | 8/1975 | Neary | 43/43.12 |
| 3,925,920 | 12/1975 | Walker | 43/43.12 |
| 3,968,587 | 7/1976 | Kammeraad | 43/43.12 |
| 4,125,958 | 11/1978 | Cote | 43/43.12 |
| 4,161,841 | 7/1979 | Holstein | 43/43.13 |

*Primary Examiner*—Nicholas P. Godici
*Attorney, Agent, or Firm*—Klarquist, Sparkman, Campbell, Leigh, Hall & Whinston

[57] ABSTRACT

A trolling planer for use in downrigger trolling systems has an elongated cylindrical weighted body and a diving plane mounted above the body. The plane is positioned forwardly of the body's center of gravity and at an angle to such body. A bridle for attaching the planer to the downrigger cable and for automatically controlling the diving angle of the planer is positioned atop the plane. A simplified release mechanism for releasably connecting the fishing line to the trolling planer employs a cylindrical female receptacle and a spring clip for insertion into the receptacle.

13 Claims, 5 Drawing Figures

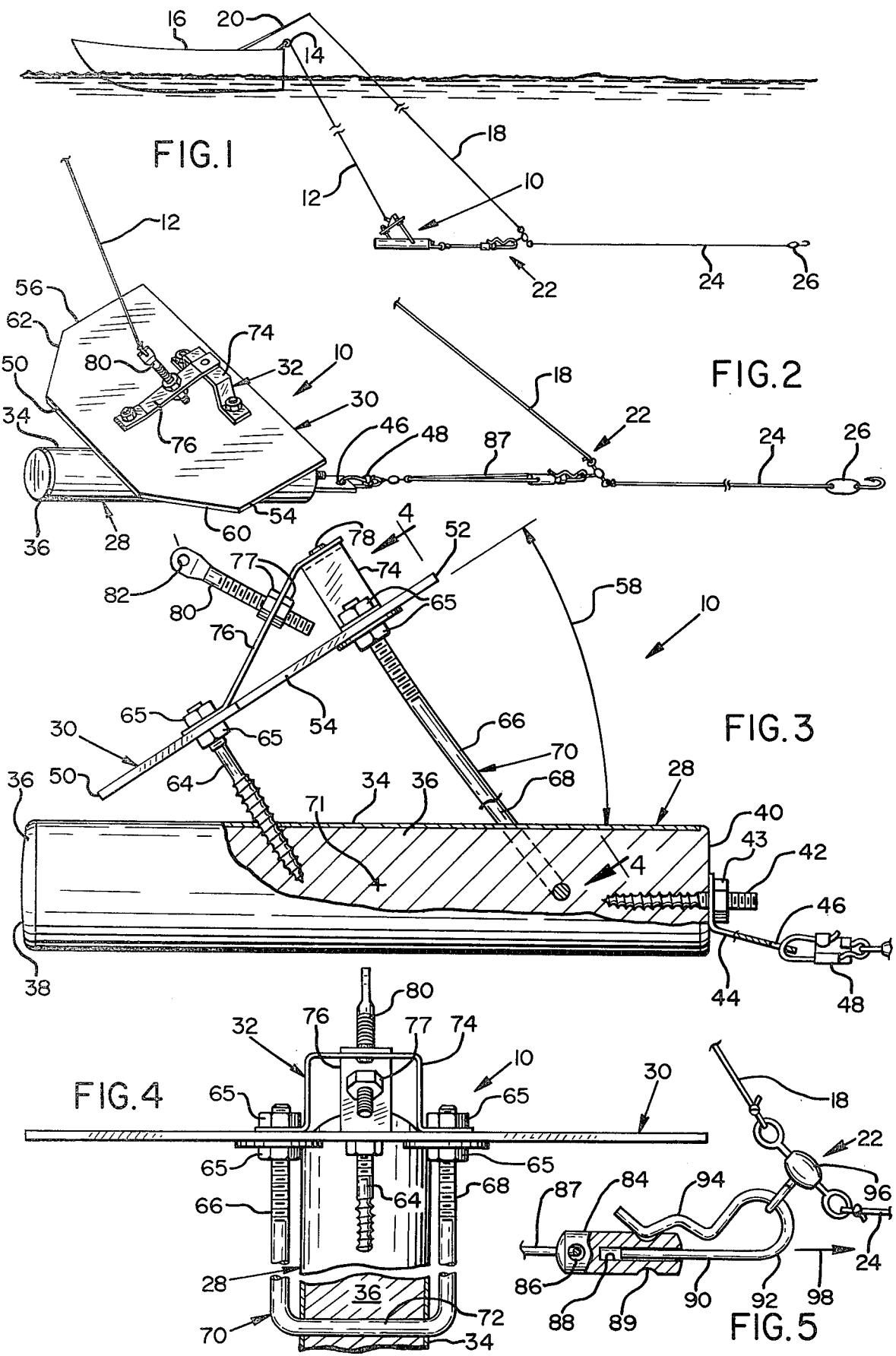

TROLLING PLANER AND RELEASE

BACKGROUND OF THE INVENTION

1. Field of the Invention

The invention relates generally to fishing line attached bodies and more particularly to weights and diving planes for releasable downrigger trolling systems.

2. Prior Art

A wide variety of sinkers and other devices have been proposed for submerging a lure or bait, while trolling, to a desired depth. For fishing in still water, a light weight suffices. For low speed shallow trolling, somewhat heavier weights are still adequate. However, for high speed trolling (3 to 5 miles per hour) at greater depths, for example, in ocean salmon fishing, substantially greater weights must be used.

Because of the difficulty of playing a fish with such weights connected directly to the fishing line, downriggers have come into common use for supporting the weight. Typical downriggers are seen in the U.S. patents of Loebensteen, U.S. Pat. No. 2,786,296; Harsch, U.S. Pat. No. 3,719,331; Rohn, U.S. Pat. No. 3,785,079; and Kammeraad, U.S. Pat. No. 3,968,587. Such downriggers are characterized by a boom mounted in the boat, a cable connecting the weight to the boom and a cable reel for dropping and retrieving the weight.

Various types of weights or sinkers have also been used. The simplest are lead or iron "cannonballs" such as is shown in U.S. Pat. No. 3,719,331, weighing as much as twenty-five to thirty pounds. Streamlined sinkers have also been used, as shown in U.S. patents to Fitzsimmons, U.S. Pat. No. 2,749,649; Tozer, U.S. Pat. No. 3,738,047; and Swanby, U.S. Pat. No. 3,800,458.

Frequently such weights wobble or spin when dragged through the water, thereby increasing drag and rising above their desired depth, or tangling or twisting the fish line or cable. To reduce these problems, various forms of stabilizing fins have been used on sinkers, as shown in the aforementioned patents to Tozer and Swanby; and in Reith, U.S. Pat. No. 3,797,159.

Such weights commonly have some means of releasing the fish line for playing the fish unencumbered once it is hooked. Numerous line release devices have been proposed. In one type of device the line is releasably held between two jaws, as shown in the aforementioned patents to Fitzsimmons and Reith; and in U.S. Patents to Borchardt, U.S. Pat. No. 3,835,572 and Ritter, U.S. Pat. No. 3,659,370. In another type of release device the fish line is wrapped or looped around some portion of the device, and spring tension compresses a second portion against the line until it is tugged free by a fish. The aforementioned patents to Swanby and U.S. Patents to Tucker, U.S. Pat. No. 3,879,884; Peterson, U.S. Pat No. 3,892,083; and Walker, U.S. Pat. No. 3,925,920 disclose such devices.

A third group of release devices utilizes two members, the first being attached to the downrigger cable and adapted for releasably holding the second such member, which is attached to the fishing line. Examples of such devices are seen in the U.S. Patents to Baum, U.S. Pat. No. 2,667,008; Brownlee, U.S. Pat. No. 3,745,688; Emory et al., U.S. Pat. No. 3,778,918; Bissonette, U.S. Pat. No. 3,816,954; Larson, U.S. Pat. No. 3,874,110; and Cote, U.S. Pat. No. 4,125,958.

Planing devices have also been proposed for submerging the fishing line for high speed trolling. One kind is fixedly connected to the fishing line. Such a device typically has a diving plane and a bridle, the bridle being positioned so that the plane assumes a diving attitude when pulled through the water. The bridle has a release mechanism for neutralizing the diving attitude of the plane when a fish is hooked. Examples of such devices are seen in U.S. patents to Kallberg, U.S. Pat. No. 2,062,718 and Neary, U.S. Pat. No. 3,897,648.

Another diving plane design, shown in the U.S. patent to DeSmidt et al., U.S. Pat. No. 3,839,813, is designed for releasable attachment to a downrigger cable and is fixedly attached to the fishing line. The above patent to Tozer, shows a similar device except that the plane is fixedly attached to the downrigger cable and releasably attached to the line.

The only known fishing line submerging device which employs the combination of a weight and a diving plane is that shown in the above patent to Borchardt. Borchardt's trolling planer employs a relatively light weight, less than one pound, to weight the front end of the plane downward at a diving angle of about thirty to sixty degrees from the horizon. As with the other trolling planers, this design tends to wobble when pulled through the water, increasing drag and thereby tending to defeat its purpose: to submerge the fishing lure deep in the water while trolling at approximately three miles per hour.

It would be preferable to be able to submerge the fishing lure or bait deep in the water for high speed trolling without requiring a very large weight. It would also be preferable to have a device that runs smoothly in the water without wobble, spin or excessive drag and which avoids tangling the fish line or cable. Finally, it would be desirable to have a device which would remain submerged and release the fish line for playing the fish relatively unencumbered once it is hooked.

SUMMARY OF THE INVENTION

It is therefore an object of the invention to provide a trolling planer device that submerges a fishing line at a relatively steep angle to the surface during high speed trolling without requiring the use of heavy weights.

Another object of the invention is to provide a device as aforesaid that is not susceptible to wobble, spin, drag, or tangling of the fishing tackle.

A further object is to provide a device as aforesaid with means to release the fishing line when a fish is hooked so that the fish can be played on a relatively unencumbered line while the submerging device remains deep in the water out of the way.

A trolling planer in accordance with the invention has an elongated cylindrical weighted body, a diving plane mounted at an angle above the body, a planer attachment means, or bridle, atop the plane, and releasable fish line holding means extending from the rear of the weighted body.

The trolling planer dispenses with the need for a very heavy weight by combining a lesser amount of weight with a suitably positioned diving plane. The diving angle of the plane, which is the downward angle of the plane's front end, is determined by the position of the plane forwardly of the center of gravity of the weighted body, by the plane's angle with respect to such body, and by the position of the bridle.

The planer is designed so that the weighted body assumes a nearly horizontal attitude as the planer moves through the water. Thus, the body more nearly resembles a fish in the water and also balances the planer to control the diving angle of the plane. The body's elongated shape and its longitudinal mass distribution dampen any yaw or wobble that might be produced by the plane.

The plane is positioned toward the front of the body and is angled so that when the planer is suspended in the air, the plane forms a small angle, for example about 5°, with the horizon, the front end of the plane pointing down. This angle may be referred to as the plane's intrinsic diving angle. When pulled through the water, the planer tends to nose down, and the diving angle gradually increases so that the planer will maintain or increase its depth in the water. The diving angle, and thus the depth of the planar, will continue to increase, for a given trolling speed, until the forces causing the planer to nose down are balanced by the weight of the rear portion of the elongated weighted body.

The bridle, by which the planer is attached to a downrigger cable, is connected atop the plane and positioned toward the front of the planer to cooperate with the body and plane in controlling the diving angle and depth of the planer. The weight of the body trailing beneath the bridle tends to resist spinning or wobbling of the planer.

The preferred fishing line holding means has two parts: a cylindrical member attached by a trailing line 87 to the body and a clip pin attached to the fishing line. The cylindrical member has an axial opening in its rear and an annular recess about its rear. The clip pin has a straight leg for insertion longitudinally into the axial opening and an undulating leg having a bend conforming to the shape of the annular channel.

The weighted body can have shiny metallic surfaces, and the plane can be colored a bright flourescent orange so that the planar serves as a lure for fish as well as a submerging device.

The foregoing and other objects, features and advantages of the invention will become more apparent from the following detailed description of a preferred embodiment of the invention, which proceeds with reference to the drawings.

BRIEF DESCRIPTION OF THE DRAWINGS

FIG. 1 is a side elevational view of a trolling planer according to the invention as it appears in the water.

FIG. 2 is a perspective view of the trolling planer of FIG. 1.

FIG. 3 is an enlarged side elevational view of the trolling planer of FIG. 1, with a portion of the body cut away to show interior construction.

FIG. 4 is a cross-sectional view taken along line 4—4 in FIG. 3.

FIG. 5 is an enlarged side elevational view of the releasable fishing line holding means of the planer of FIGS. 1 and 2, with a portion cut away to show interior construction.

DETAILED DESCRIPTION OF THE INVENTION

In FIG. 1 a trolling planer 10 is suspended by a downrigger cable 12 from a downrigger boom 14 mounted on a trolling platform, such as a boat 16. A fishing line 18, extending downwardly from a fishing pole 20 in the boat, is releasably connected to the trolling planer by releasable holding means 22.

A leader 24 and bait or lure 26 trails behind the planer during trolling. The leader is typically short, about three feet (1 meter) in length, to take advantage of the planer's ability to attract fish.

Referring to FIGS. 2 and 3, the trolling planer 10 includes a weighted body 28, a diving plane 30 mounted above body 28, and a bridle or attachment means 32 connected atop plane 30 for suspending the planer from cable 12.

Weighted body 28 is a metal cylinder consisting of a hollow tube 34 having a solid lead core 36. Tube 34 can be chrome-plated brass, stainless steel, or other salt water-resistant metal. At the ends 38, 40 of the cylinder, the soft lead core is exposed, generally blunted and slightly rounded at its corners so that the body of the planer will not damage the boat when retrieved. A stud 42, threaded at both ends, is screwed lengthwise into the rear end 40 and receives a nut 43 for mounting a bracket 44.

Bracket 44 is a flat generally L-shaped member having a hole in each leg. A first hole (not shown) receives stud 42. A second hole 46 (FIG. 2) receives a snap swivel 48 which, in turn, is connected to holding means 22. Bracket 44 is positioned below the longitudinal axis of the body so that drag on holding means 22 and lure 26 tends to lift the rear end of the body, increasing the diving angle of the plane.

Diving plane 30 is a flat, wing-like member mounted above weighted body 28. It is symmetrical about a centerline which lies in the same plane as the longitudinal axis of body 28. Its front and rear edges 50, 52 are parallel and normal to the aforementioned plane. Its side edges 54, 56 are normal to edges 50, 52. The plane forms an acute angle 58 with body 28.

Connecting front edge 50 to side edges 54, 56 are angled edges 60, 62, respectively. The angled edges, which form 45° angles with the front and side edges, give plane 30 a delta wing shape. This feature reduces turbulence as plane 30 moves through the water, and together with the angular inertia of the elongated body 28, aids in suppressing yaw. Edges 60, 62 are also less likely than 90° corners to be damaged or to damage the boat when the planer is retrieved.

Angle 58 should be within a critical range between approximately 30° and 40° in order to provide the desired diving characteristics and yet avoid the wobbling and spinning problems that arise when the diving angle of the plane becomes too great. The optimum angle appears to vary with the relative dimensions of plane 30 and the weight and shape of body 28. In one example described in greater detail hereinafter, angle 58 is approximately 33°.

Referring to FIG. 4, diving plane 30 is mounted above body 28 on a tripod consisting of threaded stud 64 and parallel threaded legs 66, 68 of a U bolt 70. The transverse portion 72 of member 70 extends through body 28 along a line normal to the body's longitudinal axis. Stud 64 is screwed into a hole in the top of body 28 at an angle toward the front of the body. Such angle is complementary to angle 58, for example 57°. The threaded upper ends of stud 64 and legs 66, 68 extend through holes (not shown) in plane 30 and are connected to the plane by pairs of nuts 65.

Stud 64 is positioned forwardly and legs 66, 68 are positioned rearwardly, of the center of gravity 71 of body 28. However, their forward angle serves to position most of diving plane 30 forwardly of such center of gravity. Consequently, the front of the planer tends to be forced downward as the planer is pulled through the water, contributing to its diving characteristics.

This design helps to maintain body 28 in a nearly horizontal attitude so that the shiny metallic body resembles a fish swimming through the water, and, together with the preferably flourescent orange coloring of the plane, tends to attract fish. Such fish are then more likely to see the bait or lure pulled close behind the planer.

Attachment means 32 is a bridle-like structure atop plane 30. It is adapted for controlling the attitude of the trolling planer in the water. An elevated transverse bracket 74 has its opposite ends attached to the upper ends of legs 66, 68. A longitudinal strap 76 extends rearwardly from a connection with the upper end of stud 64 to an attachment point on bracket 74, such as rivet 78, equidistant between legs 66, 68. Bracket 74 and strap 76 are preferably formed of flat strips of metal bent to shape.

Strap 76 provides a platform at an angle of approximately 30° with planer 30. An eyebolt 80 is connected by two nuts 77 to strap 76 rearwardly of the midpoint of the strap. The flattened, apertured head 82 of eyebolt 80 receives downrigger cable 12.

The length of eyebolt 80, its elevated position and forward angle provide a means for automatically controlling the diving angle of plane 30, thereby maintaining the selected depth of the trolling planer. If the planer begins to lag too far behind the boat, the forward component of tension induced by cable 12 tends to rock the planer forwardly to increase the downward or diving angle of plane 30, causing the planer to dive. If the planer dives too deep the upward component of tension reduces the diving angle and, accordingly, the planer's tendency to dive.

The point of attachment of cable 12 in the hole 82 can be shifted longitudinally for adjusting the diving angle of the plane by moving eyebolt 80 forwardly or rearwardly along strap 76 and, for fine-tuning adjustments, by threading the eyebolt in or out. Moving the eyebolt rearwardly or threading it toward the plane will each increase the tendency of the planer to dive.

It has proven preferable to adjust attachment means 32 so that the planer when suspended in the air on cable 12 hangs with plane 30 angled slightly downward at the front end, for example, about 5° from the horizontal. Such a shallow angle is sufficient to gradually start the planer diving when the boat begins moving while avoiding the wobble or spin problems occasioned by an initially steep diving angle. As the planer begins to lag behind the forward component of tension induced by cable 12 gradually causes the plane to assume a steeper diving angle, as discussed above.

Releasing means 22 can be any one of a variety of mechanisms for holding a fishing line during trolling and then releasing it when tugged, such as by hooking a fish. Referring to FIG. 5, the preferred releasing means has two parts. One part is a cylindrical member 84 with a transverse aperture 86 at the front for receiving line 87 and an axial opening 88 at its rear end. The other part is a clip pin 92.

Opening 88 is cylindrical and sized for loosely receiving a straight leg 90 of pin 92. Member 84 has an outer annular recess 89 near its rear end for receiving a complementary-shaped bend in an undulating leg 94 of pin 92. A three way swivel 96 connects line 18 and leader 24 to the pin.

During trolling the spring tension of leg 94 engaging recess 89 holds pin 92 in place. When a fish is hooked on lure 26, and tugs strongly enough on line 24 in the direction of arrow 98 to overcome such tension, pin 92 is pulled from portion 84. Thus, the line is released so that the fish can be played unencumbered by the planer, which remains deep in the water until retrieved.

An example of a preferred embodiment weighs about 6.5 pounds (2.95 kg.). The body is about 8" (20.3 cm.) long and has a diameter of about 1.5" (3.8 cm.). The plane is about 8" (20.3 cm.) wide and 4.75" (12.0 cm.) in length. The side edges are 2.75" (6.2 cm.). The front edge of the plane is about 1" (2.5 cm.) rearward of front end 38 and ¼" (0.63 cm.) above the body. The rear edge is about 2½" (6.2 cm.) above the body. Thus, the plane forms an angle of about 33° with the body.

Bracket 74 elevates the rear connection of strap 76 ⅞" (2.2 cm.) above the upper surface of the plane. Strap 76 has an overall length of about 3" (7.5 cm.). Eyebolt 80 is 1⅞" (4.7 cm.) long and is centered on strap 76 about 3" (7.6 cm.) rearward of front end 38. The eyebolt preferably projects about 1⅜" (3.5 cm.) above strap 76.

Having illustrated and described a preferred embodiment of the invention, it should be apparent to those skilled in the art that the invention may be modified in arrangement and detail. I claim as my invention all such modifications as come within the true spirit and scope of the following claims.

I claim:

1. A trolling planer comprising:
    an elongated weighted body;
    a diving plane connected above said body and positioned at an angle such that the front edge of said plane is nearer the body than its rear edge;
    attachment means atop said planer for attaching said planer to a downrigger cable; and
    releasable holding means connected to the rear end of said body for holding a fishing line during trolling and for releasing said line when a fish is hooked;
    the weight of said body being longitudinally distributed so as to at least partially counteract the downward inclination of the diving plane when the planer is pulled through the water.

2. A trolling planer according to claim 1 in which said body comprises an elongated cylinder whose weight is distributed substantially uniformly along its length.

3. A trolling planer according to claim 1 in which said attachment means is positioned between the center of gravity of said body and the front edge of the diving plane.

4. A trolling planer according to claim 1 in which said holding means includes a cylindrical member and a clip pin having two legs;
    said member having an axial opening in one end and an outer annular recess around said end;
    one of said legs being straight and sized to loosely fit into said opening;
    the other of said legs having a bend which conforms generally to the shape of said recess;
    said bend biasedly engaging said outer recess to releasably unite the pin and cylindrical member.

5. A trolling planer according to claim 1 in which:
    said diving plane is positioned nearer the front end of said body than the rear end thereof and at a fixed angle to said body of between thirty and forty degrees;
    said attachment means is positioned forwardly of the center of gravity of said body; and
    said attachment means projects upwardly and forwardly from said plane.

6. A trolling planer according to claim 5 in which the angle between the diving plane and the body is about 33°.

7. A trolling planer according to claim 5 in which said attachment means is positioned so that, when the planer is suspended in the air, the plane forms a small angle with the horizon, the front end of the plane pointing down.

8. A trolling planer according to claim 1 in which:
said body comprises an elongated cylinder whose weight is distributed substantially uniformly along its length;
said diving plane is symmetrical about a centerline in essentially the same plane as the longitudinal axis of said body;
said diving plane has a generally delta wing shape; and
said diving plane is positioned with its front edge near the front end of said weighted body and its rear edge near the center of gravity of said body.

9. A trolling planer according to claim 8, which said attachment means is positioned forwardly of the center of gravity of said body, projects upwardly and forwardly from said diving plane and includes adjustment means for adjusting the diving angle of said plane.

10. A trolling planer comprising:
an elongated weighted body;
a diving plane connected above said body and positioned at an angle such that the front edge of said plane is nearer the body than its rear edge;
attachment means atop said planer for attaching said planer to a downrigger cable; and
releasable holding means connected to the rear end of said body for holding a fishing line during trolling and for releasing said line when a fish is hooked;
said diving plane being positioned nearer the front end of said body than the rear end thereof so that a portion of the mass of said body trails behind and below the diving plane to stabilize the planer as it is pulled through the water.

11. A trolling planer according to claim 10 in which the angle between said plane and said body is between thirty and forty degrees.

12. A trolling planer according to claim 10 in which said attachment means projects upwardly and forwardly from said plane.

13. A trolling planer comprising:
an elongated weighted body;
a diving plane connected above said body and positioned at an angle such that the front edge of said plane is nearer the body than its rear edge;
attachment means atop said planer for attaching said planer to a downrigger cable; and
releasable holding means connected to the rear end of said body for holding a fishing line during trolling and for releasing said line when a fish is hooked;
said plane being symmetrical about a centerline and having a generally delta-wing shape along its leading edge.

* * * * *